(12) United States Patent
Anand et al.

(10) Patent No.: US 12,015,936 B2
(45) Date of Patent: *Jun. 18, 2024

(54) PROACTIVELY ADJUSTING NETWORK INFRASTRUCTURE IN RESPONSE TO REPORTING OF REAL-TIME NETWORK PERFORMANCE

(71) Applicant: AT&T Intellectual Property I, L.P., Atlanta, GA (US)

(72) Inventors: Rajan Anand, Manalapan, NJ (US); Nimish Buch, Dublin, CA (US); Timothy Neville, Redmond, WA (US); Mark Cottrell, Frisco, TX (US); David Lu, Irving, TX (US); Eshrat Huda, Hillsborough, NJ (US); Sachin Lohe, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,260

(22) Filed: Oct. 17, 2022

(65) Prior Publication Data

US 2023/0063762 A1   Mar. 2, 2023

Related U.S. Application Data

(63) Continuation of application No. 17/107,883, filed on Nov. 30, 2020, now Pat. No. 11,477,668, which is a
(Continued)

(51) Int. Cl.
*H04W 24/02* (2009.01)
*H04L 12/14* (2006.01)
(Continued)

(52) U.S. Cl.
CPC ........ *H04W 24/02* (2013.01); *H04L 12/1435* (2013.01); *H04L 41/0816* (2013.01);
(Continued)

(58) Field of Classification Search
CPC ..... H04W 24/02; H04W 4/24; H04W 64/003; H04L 41/0816; H04L 43/065;
(Continued)

(56) References Cited

U.S. PATENT DOCUMENTS 7,295,960 B2    11/2007  Rappaport
8,195,661 B2 *  6/2012   Kalavade ............... H04W 4/02
                                                709/224
(Continued)

FOREIGN PATENT DOCUMENTS

AU       2017254525 B2 *  3/2022  .......... G06F 11/3006

*Primary Examiner* — Ahmed Elallam
(74) *Attorney, Agent, or Firm* — Tong, Rea, Bentley & Kim, LLC

(57) ABSTRACT

In one example, the present disclosure describes a device, computer-readable medium, and method for proactively adjusting the infrastructure of a communications network in response to reporting of real-time network performance. For instance, in one example, a method includes obtaining real-time network performance metrics directly from a user endpoint device operated by a customer of a telecommunication service provider network, correlating the real-time network performance metrics with data from another data source, wherein the data includes data other than network performance metrics, and adjusting an infrastructure of the telecommunication service provider network in response to an insight gleaned through the correlating.

20 Claims, 6 Drawing Sheets

Related U.S. Application Data continuation of application No. 15/852,974, filed on Dec. 22, 2017, now Pat. No. 10,887,778.

(51) Int. Cl.

| | |
|---|---|
| *H04L 12/24* | (2006.01) |
| *H04L 41/0816* | (2022.01) |
| *H04L 43/065* | (2022.01) |
| *H04L 43/08* | (2022.01) |
| *H04M 15/00* | (2006.01) |
| *H04W 4/24* | (2018.01) |
| *H04W 64/00* | (2009.01) |
| *H04L 41/0631* | (2022.01) |
| *H04L 41/142* | (2022.01) |

(52) U.S. Cl.
CPC ............ *H04L 43/065* (2013.01); *H04L 43/08* (2013.01); *H04M 15/00* (2013.01); *H04M 15/41* (2013.01); *H04M 15/70* (2013.01); *H04W 4/24* (2013.01); *H04L 41/064* (2013.01); *H04L 41/142* (2013.01); *H04W 64/003* (2013.01)

(58) Field of Classification Search
CPC ....... H04L 43/08; H04L 41/142; H04L 41/40; H04L 41/0895; H04L 43/20; H04L 12/1435; H04L 41/064; H04M 15/00; H04M 15/41
See application file for complete search history.

(56) References Cited

U.S. PATENT DOCUMENTS

| | | | |
|---|---|---|---|
| 8,224,794 B2 | 7/2012 | Rappaport | |
| 8,565,766 B2 | 10/2013 | Scherzer | |
| 8,855,675 B2 * | 10/2014 | Kateley | H04L 43/045 370/242 |
| 8,886,202 B2 * | 11/2014 | Wang | H04W 24/02 455/446 |
| 8,964,582 B2 | 2/2015 | Wilkinson | |
| 9,356,832 B2 | 5/2016 | Gunnarsson | |
| 9,374,714 B2 | 6/2016 | Abusch-Magder | |
| 9,397,906 B2 | 7/2016 | Srivastava | |
| 9,432,865 B1 | 8/2016 | Jadunandan | |
| 9,439,081 B1 | 9/2016 | Knebl | |
| 9,461,729 B2 | 10/2016 | Djukic | |
| 9,483,338 B2 | 11/2016 | Bhalla | |
| 9,557,723 B2 * | 1/2017 | Nasle | G06Q 30/0206 |
| 9,654,361 B2 | 5/2017 | Vasseur | |
| 9,756,112 B2 | 9/2017 | Jana | |
| 9,807,613 B2 | 10/2017 | Egner | |
| 10,193,741 B2 * | 1/2019 | Zafer | H04L 67/535 |
| 10,200,267 B2 * | 2/2019 | Zafer | H04L 41/142 |
| 10,230,609 B2 * | 3/2019 | Chandrasekaran | H04L 47/28 |
| 10,880,154 B2 * | 12/2020 | Rahman | H04L 41/147 |
| 10,887,778 B2 | 1/2021 | Anand | |
| 10,972,358 B2 | 4/2021 | Papaloukopoulos | |
| 11,018,958 B2 | 5/2021 | Tapia | |
| 11,362,886 B2 * | 6/2022 | Rahman | H04L 41/147 |
| 11,373,254 B2 * | 6/2022 | Tapia | G06N 5/01 |
| 11,477,668 B2 * | 10/2022 | Anand | H04L 12/1435 |
| 2009/0171718 A1 | 7/2009 | Barlow | |
| 2010/0077077 A1 * | 3/2010 | Devitt | H04L 41/147 709/224 |
| 2010/0157841 A1 | 6/2010 | Puthenpura | |
| 2010/0161374 A1 * | 6/2010 | Horta | G06Q 10/00 715/764 |
| 2016/0021025 A1 | 1/2016 | Patel | |
| 2016/0150421 A1 | 5/2016 | Li | |
| 2016/0239595 A1 | 8/2016 | Maes | |
| 2016/0254961 A1 | 9/2016 | Maes | |
| 2016/0286410 A1 | 9/2016 | O'Malley | |
| 2016/0299960 A1 | 10/2016 | Chene | |
| 2016/0353240 A1 | 12/2016 | Rappaport | |
| 2017/0245176 A1 | 8/2017 | Murphy | |
| 2017/0279921 A1 | 9/2017 | Foulkes | |
| 2017/0290024 A1 | 10/2017 | Ouyang | |
| 2017/0302505 A1 * | 10/2017 | Zafer | H04L 41/0631 |
| 2017/0302553 A1 * | 10/2017 | Zafer | H04L 41/142 |
| 2017/0353991 A1 | 12/2017 | Tapia | |
| 2019/0068512 A1 | 2/2019 | Papaloukopoulos | |
| 2019/0082394 A1 | 3/2019 | Abdelmonem | |

* cited by examiner ered in any way by the communications service provider, it can be used in accordance with the present disclosure.

PROACTIVELY ADJUSTING NETWORK INFRASTRUCTURE IN RESPONSE TO REPORTING OF REAL-TIME NETWORK PERFORMANCE

This application is a continuation of U.S. patent application Ser. No. 17/107,883, filed Nov. 30, 2020, now U.S. Pat. No. 11,477,668, which is a continuation of U.S. patent application Ser. No. 15/852,974, filed Dec. 22, 2017, now U.S. Pat. No. 10,887,778; both of which are incorporated herein by reference in their entirety.

The present disclosure relates generally to the operation of communications networks, and relates more particularly to devices, non-transitory computer readable media, and methods for proactively adjusting the infrastructure of a communications network in response to reporting of real-time network performance.

BACKGROUND

Within a communications network, performance metrics such as signal quality/strength, upload speed, download speed, bandwidth, connection speed, and the like may vary from one location to another. For instance, signal strength in a first location may be twice as good as the signal strength in a second location.

SUMMARY

In one example, the present disclosure describes a device, computer-readable medium, and method for proactively adjusting the infrastructure of a communications network in response to reporting of real-time network performance. For instance, in one example, a method includes obtaining real-time network performance metrics directly from a user endpoint device associated with a subscription service provided over a telecommunication service provider network, correlating the real-time network performance metrics with data from another data source, wherein the data includes data other than network performance metrics, and adjusting an infrastructure of the telecommunication service provider network in response to an insight gleaned through the correlating.

In another example, a device includes a processor and a computer-readable medium storing instructions which, when executed by the processor, cause the processor to perform operations. The operations include obtaining real-time network performance metrics directly from a user endpoint device associated with a subscription service provided over a telecommunication service provider network, correlating the real-time network performance metrics with data from another data source, wherein the data includes data other than network performance metrics, and adjusting an infrastructure of the telecommunication service provider network in response to an insight gleaned through the correlating.

In another example, an apparatus such as a mobile user endpoint device includes a processor, a plurality of input/output devices, including a transmitter and a receiver for communicating over a telecommunication service provider network in accordance with a subscription service provided to the apparatus over the telecommunication service provider network, and a reporting module. The reporting module includes instructions which, when executed by the processor, cause the processor to perform operations including recording real-time performance metrics of the telecommunication service provider network and transmitting the real-time performance metrics to a centralized server in the telecommunication service provider network.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media, and devices for proactively adjusting the infrastructure of a communications network in response to reporting of real-time network performance. As discussed above, performance metrics such as signal quality/strength, upload speed, download speed, bandwidth, connection speed, and the like may vary from one location in a communications network to another. For instance, signal strength in a first location may be twice as good as the signal strength in a second location. Not all locations will require the same level of network performance; however, some locations may benefit from improved network performance for reasons that may be unknown to the communications service provider.

Examples of the present disclosure dynamically adjust the infrastructure of a communications network, for example to adjust the performance of the network in selected locations. In one example, the selected locations are identified by correlating real-time network performance data, which may be periodically reported by user endpoint devices associated with a subscription service (e.g., cellular phone service or other services) provided over the communications network, with non-network performance data (i.e., data other than network performance metrics). The non-network performance data may include information such as demographic data, numbers of customers subscribing to the communications service provider's services, number of customers subscribing to the communications service provider's competitors' services, respective costs of the communications service provider's services and the competitors' services, the network operator's historical responses to events that affected network performance (e.g., natural disasters, equipment failure, and the like), weather conditions, news items, and other data. Some of the non-network performance data may comprise data that is collected by entities other than the communications service provider.

Although examples of the present disclosure are described within the illustrative context of improving telecommunications network service, it will be appreciated that the present disclosure is equally applicable in other domains, including transportation, healthcare, and any domain in which disparate, and possibly distributed, data sources may contain data that can provide meaningful insights when correlated.

Figure 1:
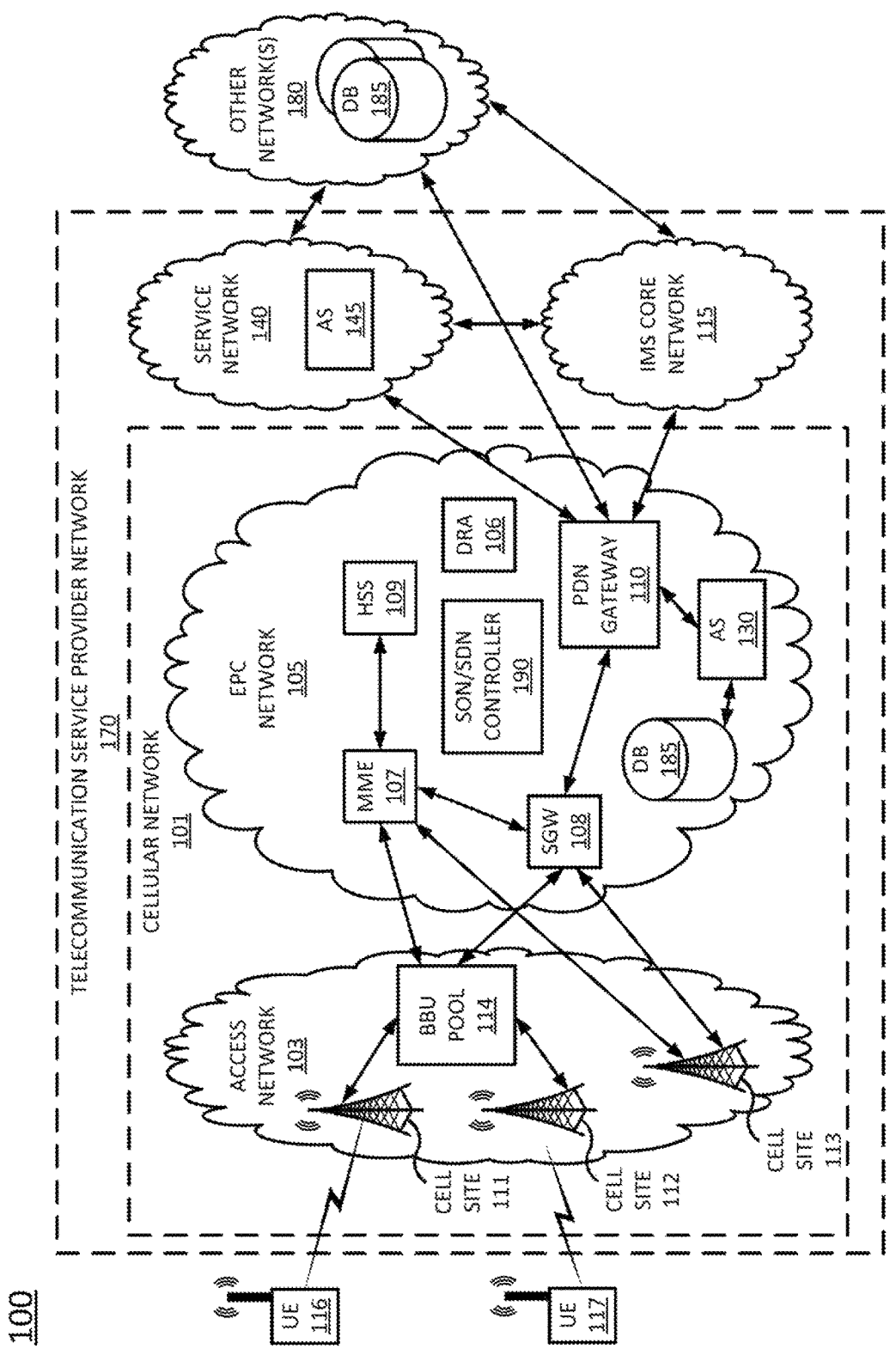
FIG. 1 illustrates an example content distribution network related to the present disclosure.

To better understand the present disclosure, FIG. 1 illustrates an example network, or system 100, in which examples of the present disclosure for proactively adjusting the infrastructure of a communications network may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 105. FIG. 1 also illustrates various endpoint devices 116 and 117, e.g., user equipment or user endpoints (UE). The endpoint devices UE 116 and 117 may each comprise mobile endpoint devices such as a cellular telephone, a smartphone, a tablet computing device, a laptop computer, a pair of computing glasses, a wireless enabled wristwatch, a connected car, or any other cellular-capable mobile telephony and computing devices (broadly, "mobile endpoint devices"). Non-mobile wireless enabled endpoint devices, such as desktop computers, smart televisions, set top boxes, gaming consoles, intelligent personal assistants, or connected home devices (e.g., Wi-Fi enabled thermostats, lighting systems, security systems, or the like), may also be connected to the telecommunication service provider network 170. In one example, UEs 116 and 117 may comprise all or a portion of a computing device or system, such as computing system 200 as described in connection with FIG. 2 below, specifically configured to provide one or more service functions in accordance with the present disclosure. The UEs 116 and 117 may be associated with a subscription service provided over the telecommunication service provider network 170, such as cellular phones services or other services.

In one example, the cellular network 101 may comprise an access network 103 and a core network, Evolved Packet Core (EPC) network 105. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may, in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all cell sites in the access network 103 are in communication with the EPC network 105 via baseband units in BBU pool 114. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, social media applications, and other services. As such, service network 140 may represent aspects of telecommunication service provider network 170 where infrastructure for supporting such services may be deployed. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, SON/SDN controller 190 (e.g., performing functions of a SON orchestrator) may activate an antenna of cell site 111 and assign a baseband unit in BBU pool 114 when a group of mobile endpoint devices is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure for activating antennas based upon a location and a movement of a group of mobile endpoint devices.

In one example, SON/SDN controller 190 may comprise all or a portion of a computing device or system, and may be configured to provide one or more functions to support examples of the present disclosure for proactively adjusting the infrastructure of a communications network, and for performing various other operations in accordance with the present disclosure. For example, SON/SDN controller 190 may work in conjunction with a cell site 111-113 and/or baseband unit of BBU pool 114 to track the signaling patterns of sample user endpoint devices 116 and/or 117, in connection with operations of the methods of FIGS. 3 and 5. For instance, SON/SDN controller 190 may store periodic reports transmitted by sample user endpoint devices relating to real-time network performance (e.g., signal quality/strength, upload speed, download speed, bandwidth, connection speed, and the like observed by the sample user endpoint devices), and these reports may be taken into account when proactively adjusting the infrastructure of the telecommunication service provider network 170.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, eNodeBs 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 400, and/or processing system 402 as described in connection with FIG. 4 below, and may be configured to perform various operations in connection with proactively adjusting the infrastructure of a communications network, and for performing various other operations in accordance with the present disclosure. For instance, AS 130 may host one or more machine learning applications that are configured to correlate data from various sources (including reports transmitted by sample user endpoint devices 116 and 117) in order to, for example, identify a root case of an observed decrease in network performance, identify an opportunity to enhance network performance through adjustment of network infrastructure, and the like. In this regard, AS 130 may maintain communications with BBU pool 114, cell sites 111-113, and so forth, via PDN gateway 110 and SGW 108, for example. One of these sources may comprise a database (DB) 185 in the EPC network 105, which may store reports transmitted by sample user endpoint devices 116 and 117. In one example, the DB 185 may store reports going back to a threshold period of time (e.g., all reports received over the last z months). Other sources may include one or more databases (DBs) 160 residing in other networks 180. To this end, the AS 103 may expose application programming interfaces (APIs) and grammars for these other databases 160 to quickly plug in and report data. AS 130 may also host an application that renders the correlated data in a visual form that preserves spatial relationships (e.g., on a map). For instance, AS 130 may render data relating to signal strength and topography on a map of a particular geographic region, in order to identify a candidate location in which to deploy a new cell site. The candidate location may balance the benefits of enhanced signal strength with the costs of deploying the new cell site in the candidate location (e.g., areas of the particular geographic region may be mountainous, or heavily wooded, or the like).

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additionally be provided by AS 145.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIGS. 2 and 4 and discussed below) or multiple computing devices collectively configured to perform various steps, functions, and/or operations in accordance with the present disclosure.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for forecasting network traffic for events. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for forecasting network traffic for events in accordance with various examples of the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
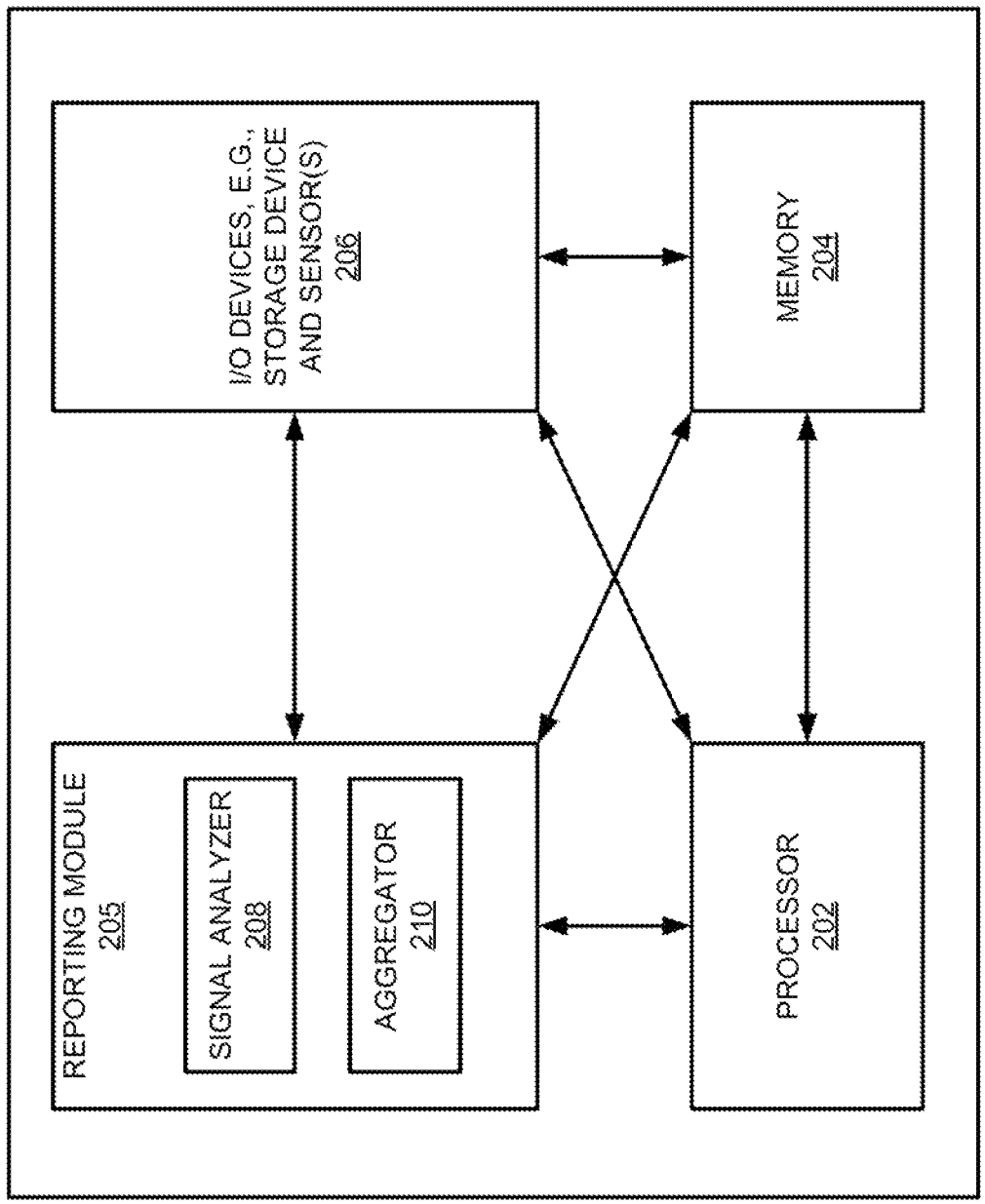
FIG. 2 is a high-level block diagram illustrating an example user endpoint device in accordance with examples of the present disclosure.

FIG. 2 is a high-level block diagram illustrating an example user endpoint device 200 in accordance with examples of the present disclosure. For example, any one or more of the UEs 116 or 117 illustrated in FIG. 1 or described in connection with the present disclosure may be implemented as the device 200. For instance, the user endpoint device 200 might comprise a mobile endpoint device such as a cellular telephone, a smartphone, a tablet computing device, a laptop computer, a pair of computing glasses, a wireless enabled wristwatch, a connected car, or any other cellular-capable mobile telephony and computing devices. The user endpoint device 200 might also comprise a non-mobile wireless enabled endpoint device, such as a desktop computer, a smart television, a set top box, a gaming console, an intelligent personal assistant, or a connected home device (e.g., a Wi-Fi enabled thermostat, lighting system, security system, or the like).

As depicted in FIG. 2, the device 200 may be configured as a dedicated computer that is specifically programmed to perform special purpose functions relating to reporting real-time network performance data. Thus, the device 200 may comprise a hardware processor element 202, a memory 204, a reporting module 205 for reporting real-time network performance data to a centralized server, e.g., AS 130 of FIG. 1, and various input/output (I/O) devices 206.

The hardware processor 202 may comprise, for example, a microprocessor, a central processing unit (CPU), or the like. The memory 204 may comprise, for example, random access memory (RAM), read only memory (ROM), a disk drive, an optical drive, a magnetic drive, and/or a Universal Serial Bus (USB) drive. The input/output devices 206 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like). In one example, the input/output devices 206 further include one or more sensors for measuring one or more network performance metrics (e.g., signal quality/strength, upload speed, download speed, bandwidth, connection speed, and the like).

The reporting module 205 for reporting real-time network performance data may include circuitry and/or logic for performing special purpose functions relating to reporting real-time network performance data. This circuitry and/or logic may be pre-installed on user endpoint devices distributed by the communications service provider. In one example, the circuitry and/or logic may include a light-weight signal analyzer 208 or other devices or instructions for recording network performance metrics (e.g., signal quality/strength, upload speed, download speed, bandwidth, connection speed, and the like) observed by the device 200 in use (e.g., as measured by the one or more sensors). The signal analyzer 208 may be programmable in real time (e.g., by a remote server such as the AS 103 of FIG. 1) to transmit any desired statistic or data, with the exception any information that could directly identify the operator of the device 200 (e.g., mobile number, mobile identifier, or the like). The circuitry and/or logic may further include an aggregator 210 or other devices or instructions for aggregating and reporting the network performance metrics recorded by the signal analyzer 208. Operations of the signal analyzer 208 and aggregator 210 are discussed in further detail below in conjunction with FIG. 3.

Although only one processor element is shown, it should be noted that the general-purpose computer may employ a plurality of processor elements. Furthermore, although only one general-purpose computer is shown in the Figure, if the method(s) as discussed below is implemented in a distributed or parallel manner for a particular illustrative example, i.e., the steps of the below method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed below can be used to configure a hardware processor to perform the steps, functions and/or operations of the below disclosed method(s). In one example, instructions and data for the reporting module or process 205 for reporting real-time network performance data (e.g., a software program comprising computer-executable instructions) can be loaded into memory 204 and executed by hardware processor element 202 to implement the steps, functions or operations as discussed below in connection with the example method of FIG. 3. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present reporting module 205 for reporting real-time network performance data (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or a user endpoint device.

Figure 3:
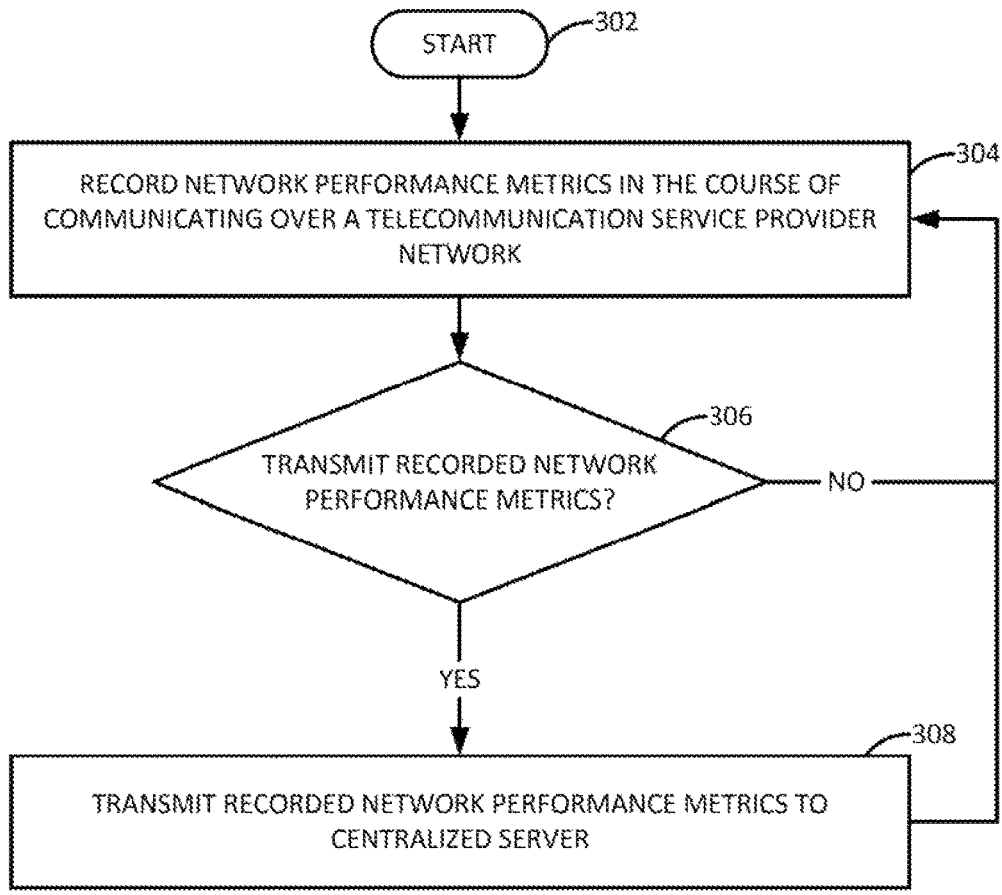
FIG. 3 illustrates a flowchart of an example method for reporting real-time network performance data.

FIG. 3 illustrates a flowchart of an example method 300 for reporting real-time network performance data, in accordance with the present disclosure. In one example, steps, functions and/or operations of the method 300 may be performed by a UE 116, 117, or 200 as illustrated in FIG. 1 or FIG. 2. However, any references to components of the UEs 116, 117, and/or 200 are made for illustrative purposes only, and are not meant to limit the means by which the method 300 may be performed.

The method 300 begins in step 302. In step 304, real-time network performance metrics are recorded in the course of communicating over a telecommunication service provider network. For instance, a user endpoint device may participate in a call with another user endpoint device over a cellular network, or may access data (e.g., browse the Internet, stream a movie or music, or the like) from a server or other data source in the network. In the course of these communications, the user endpoint device may observe and record certain metrics indicative of the network's performance, such as signal quality/strength, upload speed, download speed, bandwidth, connection speed, and the like. In one example, each recorded metric may include a location from which the metric was recorded and a timestamp indicating the time of day at which the metric was recorded. In a further example, each recorded metric may include additional information such as the type of the network associated with the metric, the remaining battery life of the device that recorded the metric, and other data that may be useful to other applications.

In step 306, it is determined whether any recorded network performance metrics should be transmitted to a centralized server (e.g., AS 130 of FIG. 1 or a similar device). For instance, a user endpoint device may transmit recorded network performance metrics on a periodic basis (e.g., every x minutes), where expiration of a timer may indicate that it is time to report. In one example, the periodic basis may be modified based on movement of the user endpoint device.

For instance, if the user endpoint device has not moved more than a threshold distance (e.g., y miles) since the last time it reported network performance data, it may skip a reporting cycle. In another example, the user endpoint device may transmit recorded network performance metrics each time it moves a threshold distance (e.g., every y miles). In another example, the user endpoint device may report network performance metrics only if they fall below some predefined threshold, which may be set by the communications service provider. In another example still, the threshold or conditions for reporting frequency may be dynamically adjustable by the communications service provider. For instance, the communications service provider may wish to increase reporting frequency in certain locations during peak traffic periods or when a natural disaster occurs. Conversely, reporting frequency may be decreased in certain locations during periods of lower network usage (e.g., overnight). In a similar manner, the communications service provider may also dynamically adjust the types of data that are reported (e.g., the specific network performance metrics or other data).

If it is determined in step 306 that the recorded network performance metrics should be transmitted, then the method 300 proceeds to step 308. In step 308, the recorded network performance metrics are transmitted, e.g., directly to the centralized server. The transmission may occur using machine-to-machine technology. The recorded metrics may be aggregated in some way prior to transmission, or it may be sent as discrete data points. The method 300 then returns to step 304 and continues to record network performance metrics as discussed above, and to report the network performance metrics according to the reporting cycle.

If, however, it is determined in step 306 that the recorded network performance metrics should not be transmitted yet, then the method 300 returns to step 304 and continues to record network performance metrics as discussed above, and to report the network performance metrics according to the reporting cycle. Thus, the method 300 may iterate continuously, e.g., until the function is disabled by the user.

Figure 4:
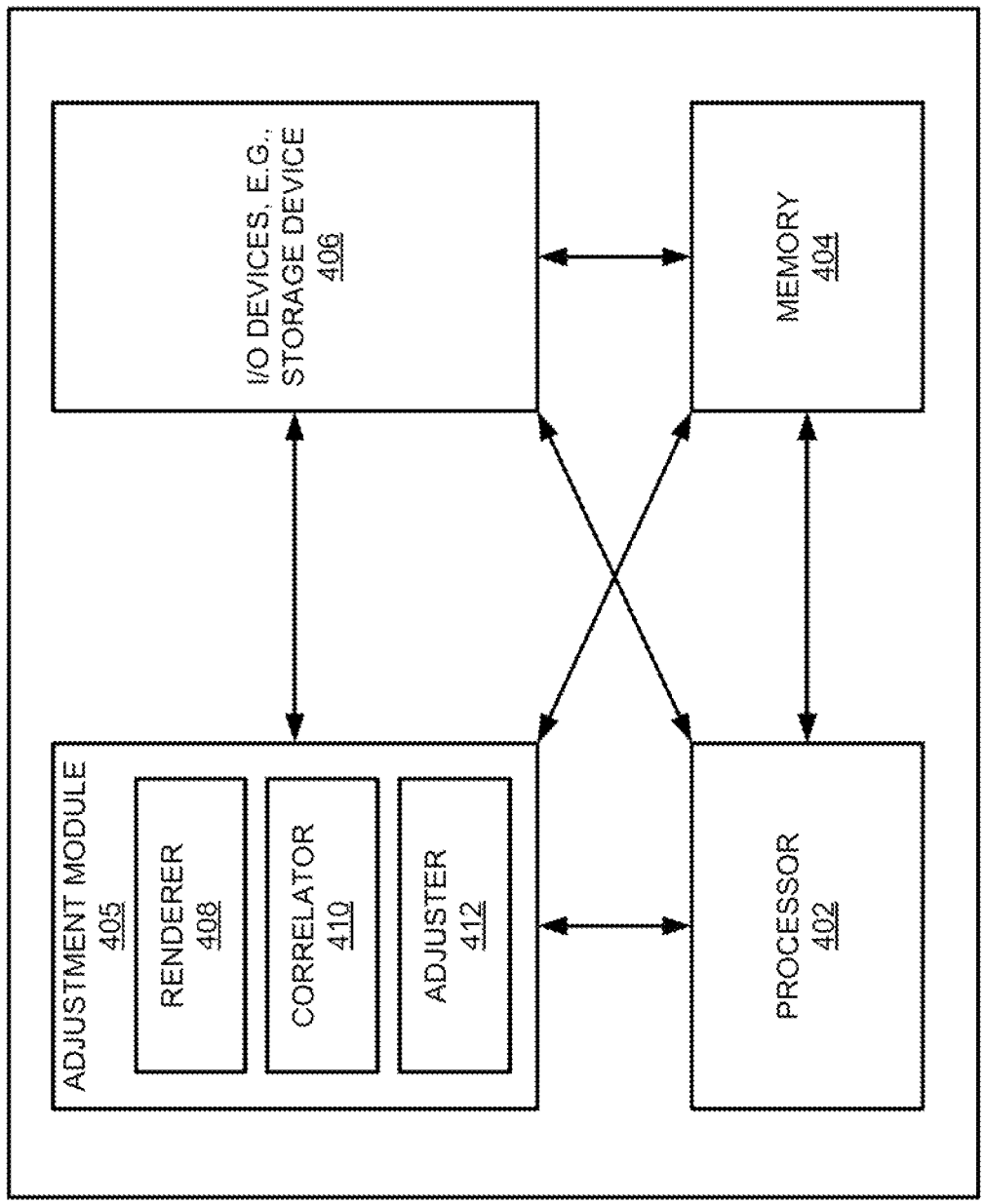
FIG. 4 is a high-level block diagram illustrating an example application server in accordance with examples of the present disclosure.

FIG. 4 is a high-level block diagram illustrating an example application server 400 in accordance with examples of the present disclosure. For example, any one or more of the AS 130 illustrated in FIG. 1 or described in connection with the present disclosure may be implemented as the application server 400.

As depicted in FIG. 4, the application server 400 may be configured as a dedicated computer that is specifically programmed to perform special purpose functions relating to proactively adjusting the infrastructure of a communications network in response to reporting of real-time network performance. Thus, the applications server 400 may comprise a hardware processor element 402, a memory 404, an adjustment module 405 for adjusting the infrastructure of a communications network in response to reporting of real-time network performance (e.g., by UEs in the communications network, such as the UEs illustrated in FIG. 1 and FIG. 2), and various input/output (I/O) devices 406.

The hardware processor 402, memory 404, and input/output devices 406 may be configured in a manner and include components similar to the hardware processor 202, memory 204, and input/output devices 206 of FIG. 2.

The adjustment module 405 for proactively adjusting the infrastructure of a communications network may include circuitry and/or logic for performing special purpose functions relating to evaluating real-time network performance data and identifying network infrastructure adjustments that are responsive to the evaluation. In one example, the circuitry and/or logic may include a renderer 408 or other devices or instructions for rendering reported network performance metrics in some sort of visual manner (e.g., plotting on a map of a particular geographic region). The renderer may include pluggable components that allow for future extension. The circuitry and/or logic may further include a correlator 410 or other devices or instructions for correlating the network performance metrics with data from other sources, which may include non-network performance data. In one example, the correlator may include one or more pluggable engines, some of which may employ machine learning techniques, for determining a root cause of an observed condition. For instance, each pluggable engine may be configured to perform root cause analysis for a different domain (e.g., telecommunications, transportation, healthcare, etc.). The circuitry and/or logic may further include an adjuster 412 to adjusting the infrastructure of the telecommunication service provider network 170 in response to real-time network performance data reported by user endpoint devices. Operations of the renderer 408, the correlator 410, and the adjuster 412 are discussed in further detail below in conjunction with FIG. 5.

Figure 5:
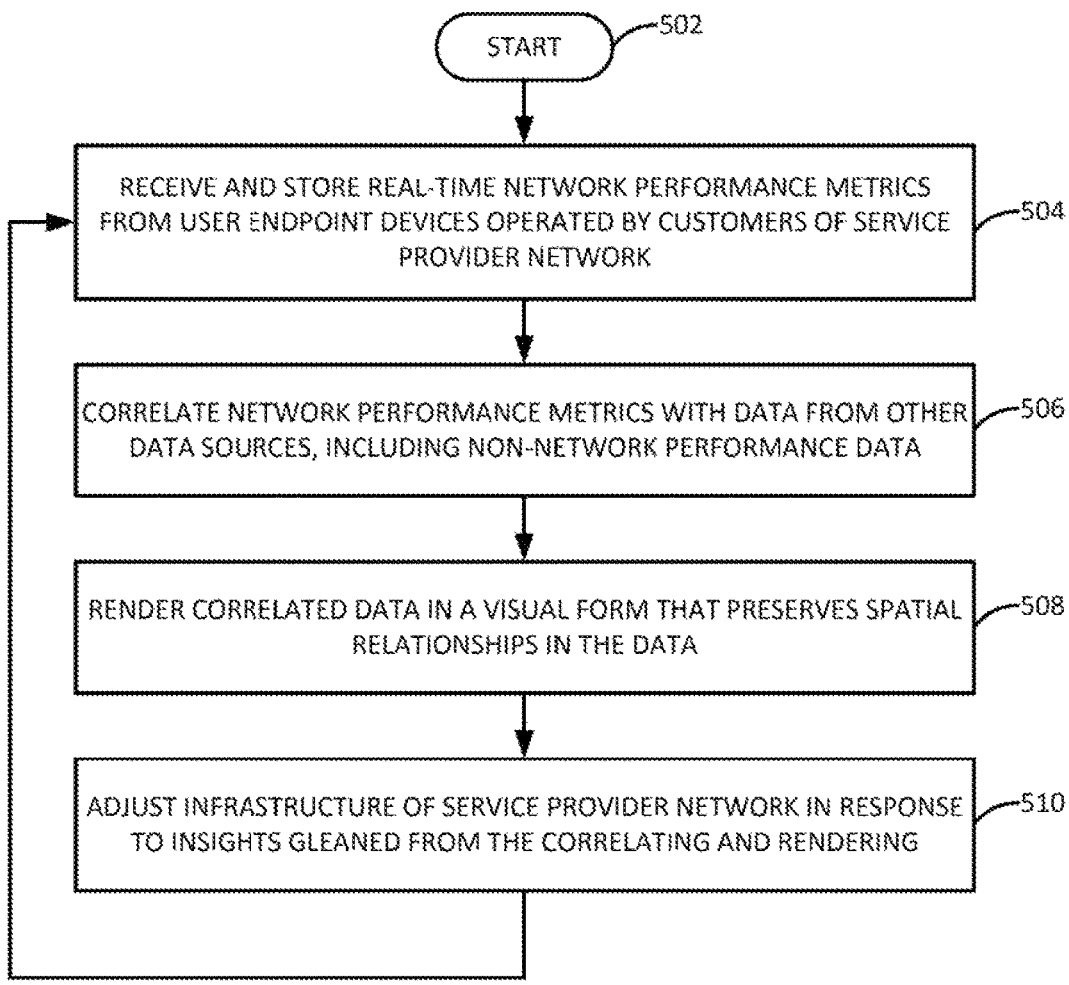
FIG. 5 illustrates a flowchart of an example method for adjusting the infrastructure of a telecommunications service provider network in response to real-time network performance data, in accordance with the present disclosure.

FIG. 5 illustrates a flowchart of an example method 500 for adjusting the infrastructure of a telecommunications service provider network in response to real-time network performance data, in accordance with the present disclosure. In one example, steps, functions and/or operations of the method 500 may be performed by an application server (AS) 130 or 400 as illustrated in FIG. 1 or FIG. 4. However, any references to components of the AS 130 and/or 400 are made for illustrative purposes only, and are not meant to limit the means by which the method 500 may be performed.

The method 500 begins in step 502. In step 504, real-time network performance metrics are received or obtained directly from user endpoint devices operated by customers of a telecommunication service provider network and are stored (e.g., in a database, such as DB 185). For instance, the user endpoint devices might comprise mobile endpoint devices such as cellular telephones, smartphones, tablet computing devices, laptop computers, pairs of computing glasses, wireless enabled wristwatches, connected cars, and/or any other cellular-capable mobile telephony and computing devices. The user endpoint devices might also comprise non-mobile wireless enabled endpoint devices, such as desktop computers, smart televisions, set top boxes, gaming consoles, intelligent personal assistants, and/or connected home devices (e.g., Wi-Fi enabled thermostats, lighting systems, security systems, or the like). The network performance metrics received in step 504 may include metrics such as signal quality/strength, upload speed, download speed, bandwidth, connection speed, and the like. In one example, each recorded metric may include a location from which the metric was recorded and a timestamp indicating the time of day at which the metric was recorded. Thus, the locations (e.g., global positioning system coordinates) of user endpoint devices may be obtained in real time, without the need for triangulation or other techniques. In a further example, each recorded metric may include additional information such as the type of the network associated with the metric, the remaining battery life of the device that recorded the metric, and other data that may be useful to other applications. In one example, any data received from a user endpoint device in step 504 is anonymized to preserve user privacy.

In step 506, the network performance metrics received in step 504 are correlated with other directly and/or indirectly relevant data, which may include non-network performance data, from other data sources. The non-network performance data may include information such as demographic data, numbers of customers subscribing to the communications service provider's services, number of customers subscribing to the communications service provider's competitors' services, the network operator's historical responses to events that affected network performance (e.g., natural disasters, equipment failure, and the like), weather conditions, news items, and other data. Some of the other data, including the non-network performance data, may comprise data that is collected by entities other than the communications service provider.

In one example, correlating the network performance metrics with other data involves drawing insights from the combined data. The insights may be drawn based on one or more configuration parameters, which may be set by the communications service provider, and may allow the communications service provider to identify a root cause of an observed condition in the telecommunication service provider network or to make a better-informed decision concerning network infrastructure. For instance, the configuration parameters may be set to allow browsing and analysis of signal strength based on one or more parameters such as time window (e.g., last y months), signal strength range, mobile device battery life, and/or other correlations with other data sources.

As an example, correlating signal strength with topological data may allow the communications service provider to identify a location at which a new cell site can be deployed to maximize an improvement in signal strength while minimizing the costs of deployment.

In one example, the correlating is driven by a machine learning technique that learns, over time, which data sources to consult and correlate to produce the most useful insights. Moreover, identified root causes of observed conditions can be stored in the knowledge base, as they may prove related to conditions observed in the future.

In step 508, the network performance metrics received in step 504 and/or the other data with which the network performance metrics have been correlated in step 506 are rendered in a visual form that preserves spatial relationships in the data (e.g., on a map). For example, data relating to signal strength may be rendered on a map of a particular geographic region, in order to identify locations at which signal strength may be particularly good or particularly poor. For instance, an individual data point indicating a signal strength measurement from a specific location may be plotted at that specific location on a map and rendered in a color or shade that indicates the strength of the signal. Plotting data from multiple sources may allow for the identification of otherwise obscure insights, such as the relationships between signal strength, demographics, income, and entrepreneurial data.

In step 510, the infrastructure of the telecommunications service provider network is adjusted in response to insights gleaned from the correlating and the rendering performed in steps 506 and 508. For example, based on the correlating and rendering, the communications service provider may identify locations in which it may be most beneficial (e.g., provide the greatest return on investment) to improve the signal strength. For instance, if signal strength is relatively weak in a geographic region where many commercial businesses have places of operations, the communications service provider may wish to improve signal strength (e.g., by deploying one or more new macro or micro cell sites) in that geographic region in order to make its services more attractive to those commercial businesses. By consulting various data sources, the communications service provider may be able to identify candidate cell sites in the geographic region. Alternatively, if signal strength is stronger than needed in a first location and weaker than desired in a second location, the adjustment may comprise breaking a cell site having a redundant eNodeB in the first location into two cell sites, e.g., one cell site for the first location and one cell site for the second location.

The method 500 then returns to step 504 and continues to receive and analyze network performance metrics as discussed above.

Thus, examples of the present disclosure allow a communications service provider to automatically draw otherwise obscure insights from disparate and unlikely data sources, which in turn may allow the communications service provider to improve service in regions where the greatest return on investment may be realized. For instance, examples of the present disclosure allow automated cellular network quality analysis and real-time root cause analysis to identify cellular network coverage, identify gaps in coverage, and offer recommended adjustments to cellular network infrastructure. Examples of the present disclosure also allow simulation of network deployments that can be compared to actual results on the ground. Examples of the present disclosure also allow the automatic identification of cellular coverage gaps and network quality degradation over time (e.g., due to changes in real estate, natural disasters, or the like). In one example, all of these insights may be generated in a manner that is transparent and unobtrusive to the communications service provider's customers.

Although not expressly specified above, one or more steps of the method 300 or the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 or FIG. 5 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

Figure 6:
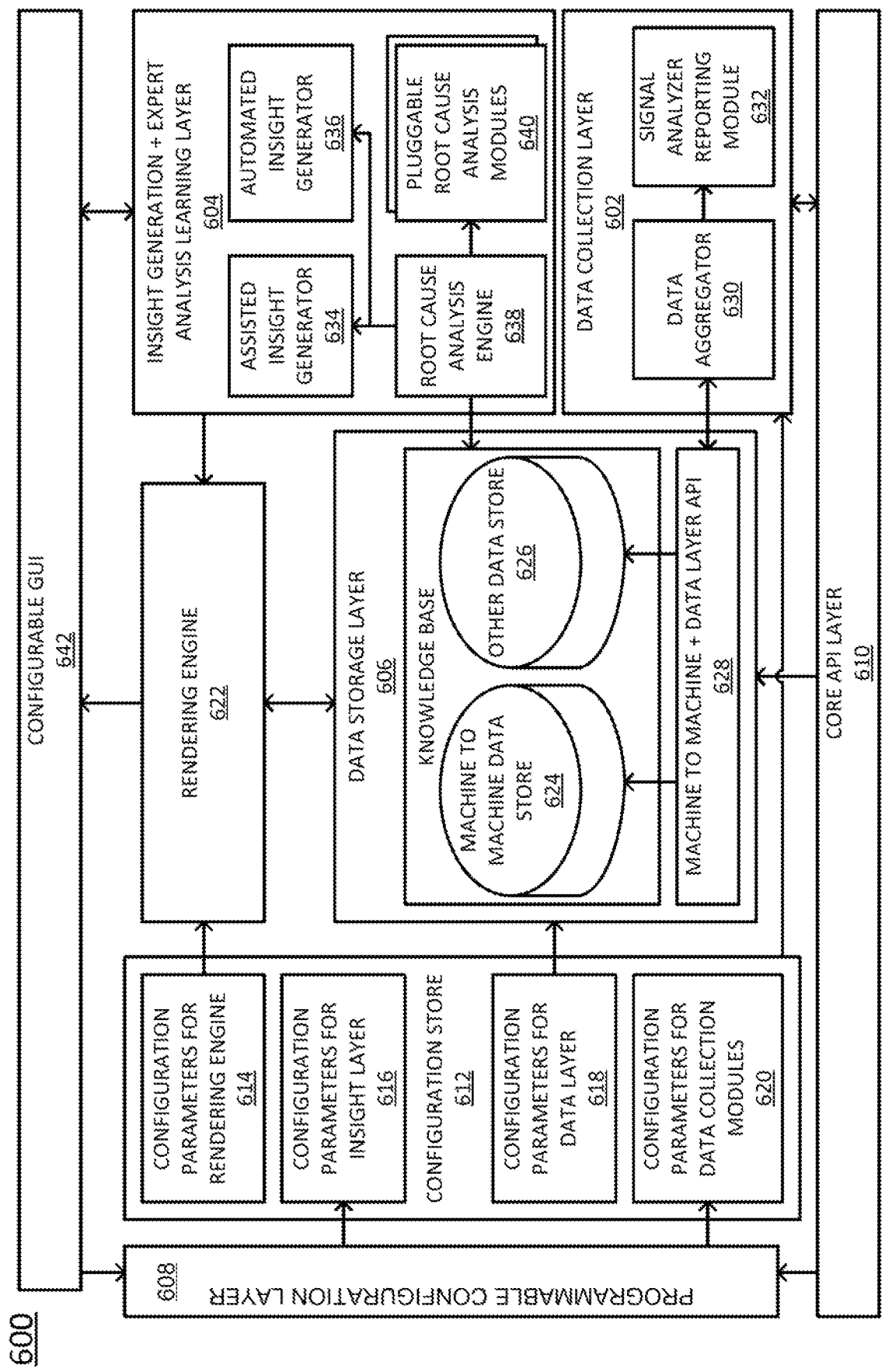
FIG. 6 is a block diagram illustrating relationships between components of an example system of the present disclosure.

FIG. 6 is a block diagram illustrating relationships between components of an example system 600 of the present disclosure. For instance, FIG. 6 illustrates, in block diagram format, many of the components of the network 100 illustrated in FIG. 1. In one example, the system 600 of FIG. 6 generally comprises a plurality of logical layers, including a data collection layer 602, an insight generation and expert analysis learning layer 604, a data storage layer 606, a programmable configuration layer 608, and a core application programming interface (API) layer 610. In addition, the system 600 may comprise a rendering engine 622 and a configurable graphical user interface (GUI) 642.

The data collection layer 602 may reside primarily in the background on the user endpoint devices (e.g., UE 116 and 117 of FIG. 1 and additional user endpoint devices) of a telecommunication service provider network. In one example, the data collection layer 602 comprises a signal analyzer reporting module 632 and a data aggregator 630 that are functionally similar to the signal analyzer 208 and aggregator 210 of FIG. 2. That is, the signal analyzer reporting module 632 and a data aggregator 630 may measure, aggregate, and/or report network performance metrics observed from the perspective of the user endpoint devices. The data collection layer may comprise a signal analyzer reporting module 632 and a data aggregator 630 for each user endpoint device that reports to the system 600. The modular configuration of the data collection layer 602 allows various sources of network performance data (e.g., mobile phones, connected cars, connected home devices, Internet of Things systems, etc.) to be plugged into the system 600 to provide data.

The insight generation and expert analysis learning layer 604 may reside primarily on a centralized server (e.g., AS 130 of FIG. 1) of the telecommunication service provider network. In one example, the insight generation and expert analysis learning layer 604 comprises an assisted insight generator 634 and automated insight generator 636, which may be functionally similar to the adjuster 412 illustrated in FIG. 4. Additionally, the insight generation and expert analysis learning layer 604 may comprise a root cause analysis engine 638 and one or more pluggable root cause analysis modules 640, which may be functionally similar to the correlator 410 illustrated in FIG. 4. Thus, in one example, the root cause analysis engine 638 may analyze individual data sources or combinations of data sources to draw automated insights (e.g., in conjunction with the automated insight generator 636) or assisted insights (e.g., in conjunction with the assisted insight generator 634 and/or one or more human operators) that may help in identifying potential adjustments to the infrastructure of the telecommunication service provider network. The manner in which these insights are drawn may be based on one or more configuration parameters set through the programmable configuration layer 608 and stored in the configuration store 612, as discussed in further detail below.

The data storage layer 606 may reside primarily in one or more databases (e.g., DBs 185 and 160) of the telecommunication service provider network and/or other networks. In one example, the data storage layer 606 generally comprises a machine to machine and data layer application programming interface (API) 628 and a knowledge base, where the knowledge base further comprises at least a machine to machine data store 624 and another data store 626. In one example, the machine to machine and data layer API 628 facilitates communicates between the knowledge base and various sources of data. In one example, the machine to machine data store 624 stores network performance metrics reported by the data collection layer 602, while the other data store 626 stores other types of data which may be reported by other devices and/or databases. Additionally, the other data store 626 may store insights and root cause conditions identified by the insight generation and expert analysis learning layer 604, which may inform future attempts to proactively adjust the infrastructure of the telecommunication service provider network.

The programmable configuration layer 608 may be configured to accept one or more configuration parameters, which may be set by the communications service provider. The configuration parameters may be set to allow browsing and analysis of one or more specific network performance metrics based on one or more parameters such as time window (e.g., last y months), signal strength range, mobile device battery life, and/or other correlations with other data sources.

The core API layer 610 may comprise application programming interfaces and grammars that allow various data sources (e.g., user endpoint devices, databases, and the like) to quickly plug into the system 600 to provide data that may be useful in generating insights to drive adjustments to the telecommunication service provider network infrastructure. Thus, the core API layer 610 may expose APIs which other applications can utilize to perform queries and customized analyses. The core API layer 610 may also provide a defined API interface through which the various layers of the system 600 may cooperate in a pluggable, modular fashion.

The configuration store 612 may centrally store configuration parameters for the various components of the system 600. For instance, in one example, the configuration store 612 further comprises configuration parameters 614 for the rendering engine 622, configuration parameters 616 for the insight generation and expert analysis learning layer 604, configuration parameters 618 for the data storage layer 606, and configuration parameters 620 for the data collection layer (or modules) 602. Configuration parameters 614 for the rendering engine 622 may control, for instance, what types of data are rendered by the rendering engine 622 and/or the formats of the renderings. Configuration parameters 616 for the insight generation and expert analysis learning layer 604 may control, for instance, what types of data are correlated with each other to generate insights. Configuration parameters 618 for the data storage layer 606 may control, for instance, what types of data are stored in the data storage layer 606 and/or for how long data is stored in the data storage layer 606. Configuration parameters 620 for the data collection layer 602 may control, for instance, what types of data are reported by the user endpoint devices and/or how often the data is reported.

The rendering engine 622 may comprise a device that renders correlated data (e.g., network performance metrics correlated with other data, such as non-network performance data) in a visual form that preserves spatial relationships (e.g., on a map). Thus, the rendering engine 622 may be functionally similar to the renderer 408 illustrated in FIG. 4. In one example, the rendering engine 622 may include pluggable components that allow for future extension of the rendering engine 622.

The configurable GUI 642 may be configured to accept user inputs such as configuration parameters for various layers of the system 600 (e.g., configuration parameters stored in the configuration store 612). The configurable GUI 642 may also be configured to display certain information to a user, such as visual data rendered by the rendering engine 622 and/or infrastructure adjustments produced by the insight generation and expert analysis learning layer 604. The visual data displayed to the user may also be controlled by configuration parameters (e.g., time window of analysis, color-to-intensity levels to various metrics, types of data correlated, etc.) that are input via the configurable GUI 642 and stored in the configuration store 612, as discussed above.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, via a processor, real-time network performance metrics directly from a user endpoint device associated with a subscription service provided over a communication service provider network;
correlating, via the processor, the real-time network performance metrics with data from at least one data source other than the user endpoint device, wherein the data includes data other than network performance metrics, and wherein the data other than network performance metrics includes topological data of a particular geographic region; and activating, via the processor, a new cell site of the communication service provider network in response to an identification of a root cause of an observed condition by the correlating.

2. The method of claim 1, wherein the real-time network performance metrics include a signal strength observed by the user endpoint device.

3. The method of claim 1, wherein the real-time network performance metrics are reported by the user endpoint device on a periodic basis.

4. The method of claim 1, wherein the data other than network performance metrics further includes a number of customers subscribing to services of a competitor of the communication service provider network.

5. The method of claim 1, wherein the data other than network performance metrics further includes respective costs of services provided by a service provider operating the communication service provider network and services provided by competitors of the service provider.

6. The method of claim 1, wherein the data other than network performance metrics further includes a historical response of the communication service provider network to an event that affected performance of the communication service provider network.

7. The method of claim 1, wherein the data other than network performance metrics further includes weather conditions.

8. The method of claim 1, wherein the data from the at least one data source comprises data collected by an entity other than a service provider operating the communication service provider network.

9. The method of claim 1, wherein the correlating comprises:

rendering the real-time network performance metrics and the data from the at least one data source in a visual manner that preserves spatial relationships in the real-time network performance metrics and the data from the at least one data source.

10. The method of claim 9, wherein the rendering comprises:

plotting each data point of the real-time network performance metrics and the data from the at least one data source on a map, wherein a position of the each data point on the map indicates a location from which information contained in each data point was observed.

11. The method of claim 1, wherein the user endpoint device comprises a mobile endpoint device.

12. The method of claim 1, wherein the user endpoint device comprises a non-mobile wireless-enabled endpoint device.

13. The method of claim 1, wherein a location of the new cell site is selected to improve a signal strength at a particular location in the communication service provider network where no previous cell site existed.

14. The method of claim 1, wherein the activating the new cell site comprises: breaking an existing cell site in the communication service provider network into two cell sites when the existing cell site has a redundant eNodeB in a first location at which a signal strength is stronger than needed, wherein the two cell sites include a first cell site for the first location and a second cell site for a second location at which a signal strength is weaker than desired.

15. A device comprising:
a processor; and
a computer-readable medium storing instructions which, when executed by the processor, cause the processor to perform operations, the operations comprising:
obtaining real-time network performance metrics directly from a user endpoint device associated with a subscription service provided over a communication service provider network;
correlating the real-time network performance metrics with data from at least one data source other than the user endpoint device, wherein the data includes data other than network performance metrics, and wherein the data other than network performance metrics further includes topological data of a particular geographic region; and
activating a new cell site of the communication service provider network in response to an identification of a root cause of an observed condition by the correlating.

16. A computer-readable storage device storing a plurality of instructions which, when executed by a processor, cause the processor to perform operations, the operations comprising:
obtaining real-time network performance metrics directly from a user endpoint device associated with a subscription service provided over a communication service provider network;
correlating the real-time network performance metrics with data from at least one data source other than the user endpoint device, wherein the data includes data other than network performance metrics, and wherein the data other than network performance metrics further includes topological data of a particular geographic region; and
activating a new cell site of the communication service provider network in response to an identification of a root cause of an observed condition by the correlating.

17. The computer-readable storage device of claim 16, wherein the real-time network performance metrics include a signal strength observed by the user endpoint device.

18. The computer-readable storage device of claim 16, wherein the real-time network performance metrics are reported by the user endpoint device on a periodic basis.

19. The computer-readable storage device of claim 16, wherein the data other than network performance metrics further includes a number of customers subscribing to services of a competitor of the communication service provider network.

20. The computer-readable storage device of claim 16, wherein the data other than network performance metrics further includes respective costs of services provided by a service provider operating the communication service provider network and services provided by competitors of the service provider.

* * * * *